United States Patent [19]
Sakai et al.

[11] Patent Number: 5,294,394
[45] Date of Patent: Mar. 15, 1994

[54] PROCESS FOR PREPARATION OF FIBER-REINFORCED THERMOPLASTIC MOLDED ARTICLES INCLUDING SPECIAL REINFORCEMENT

[75] Inventors: Hideo Sakai, Toshiyuki Nakakura, Tomohito Koba, Misao Masuda, Chiaki Maruko, Satoru Kishi, all of Kanagawa, Japan

[73] Assignee: Mitsui Toatsu Chemicals, Inc., Tokyo, Japan

[21] Appl. No.: 584,167

[22] Filed: Sep. 18, 1990

[30] Foreign Application Priority Data

Oct. 3, 1989 [JP] Japan .................. 2-57072

[51] Int. Cl.$^5$ ............................................. B29C 67/14
[52] U.S. Cl. ..................... 264/135; 156/242; 156/245; 264/136; 264/258
[58] Field of Search ............... 264/36, 135, 257, 258, 264/136; 156/242, 245

[56] References Cited

U.S. PATENT DOCUMENTS

| | | | |
|---|---|---|---|
| 2,004,652 | 6/1935 | Dempsey | 264/258 |
| 2,042,210 | 5/1936 | Clay | 264/258 |
| 2,749,266 | 6/1956 | Eldred | 264/137 |
| 2,943,969 | 7/1960 | Boyer et al. | 264/36 |
| 3,282,761 | 11/1966 | Evangelist | 264/46.7 |
| 3,926,708 | 12/1975 | Long | 156/242 |
| 3,956,447 | 5/1976 | Denommee et al. | 264/258 |
| 4,172,002 | 10/1979 | Gluckin | 264/258 |
| 4,218,273 | 8/1980 | Feist et al. | 156/242 |
| 4,305,903 | 12/1981 | Krause | 264/258 |
| 4,349,599 | 9/1982 | Adams | 264/135 |
| 4,937,032 | 6/1990 | Krone et al. | 264/258 |

FOREIGN PATENT DOCUMENTS

| | | |
|---|---|---|
| 0255315A3 | 2/1988 | European Pat. Off. |
| 0291267 | 11/1988 | European Pat. Off. |
| A2443912 | 7/1980 | France |
| 48907 | 2/1990 | Japan |
| WO89/01123 | 2/1989 | World Int. Prop. O. |

Primary Examiner—Jay H. Woo
Assistant Examiner—Robert B. Davis
Agent, Attorney, or Firm—Burns, Doane, Swecker & Mathis

[57] ABSTRACT

A process for preparing a molded article of fiber-reinforced plastic having an optional configuration and no tendency to deformation and cracks by using a plate material including a fibrous reinforcement and a thermoplastic resin, including the steps of previously setting-up, on the plate material and/or a mold, a sheet prepreg obtained by impregnating a unidirectionally arranged fiber or woven cloth with a thermoplastic resin in areas where the fibrous reinforcement does not follow the flow of the resin well or in areas where special reinforcement is required and successively carrying out integral molding to obtain said article; and a molded article obtained by the process.

8 Claims, 4 Drawing Sheets

PROCESS FOR PREPARATION OF FIBER-REINFORCED THERMOPLASTIC MOLDED ARTICLES INCLUDING SPECIAL REINFORCEMENT

BACKGROUND OF THE INVENTION a. Field of the Invention

The present invention relates to a molded article of fiber-reinforced thermoplastic which is light weight, has excellent mechanical strength, and can be utilized for various applications including automobile parts such as a bumper backup beam, door beam and seat shell, structural materials and machinery parts. The invention also relates to a process for preparing the material.

b. Description of the Prior Art

Fiber-reinforced thermoplastics (FRTP) are light weight and provide excellent mechanical strength. Hence, they are used in the form of molded articles for automobile parts, structural materials, machinery parts and other fields. The molded article is typically prepared by using a plate material essentially consisting of a thermoplastic resin and fibrous reinforcement as raw materials and by carrying out stamping and other molding processes.

In the stamping process, the plate material is heated above the melting temperature of the resin to provide fluidity for the plate material itself. Thereafter, the plate material is placed in a mold maintained at a temperature lower than the melting temperature of the resin, the mold is immediately closed, and cooling and forming are simultaneously carried out to obtain a molded article of an arbitrary form. The process, however, is liable to cause deformations or cracks in certain portions of the molded article particularly in the case of molding a complex shaped article. Consequently, restriction has been imposed upon the use of such materials.

Another process which has been tried, uses a sheet prepreg containing a unidirectionally arranged fiber, or a woven cloth impregnated with a thermoplastic resin, as a raw material of the molded article. However, a molded article prepared from the sheet prepreg cannot overcome the above problems of deformations and cracks, although strengths are generally higher than with articles prepared from the plate material. Additionally, the sheet prepreg is more expensive than the plate material. Constitution of the whole molded article with the sheet prepreg leads to higher production costs for the molded article.

In order to solve the problems of deformations and cracks, another process increases the overall strength of the molded article by selecting a specific resin and/or fibrous reinforcement for the plate material. For example, generation of deformations and cracks can be prevented by selection of high performance engineering plastics and/or carbon fiber. However, such plastics and fibrous reinforcement are very expensive. Consequently, it is unfavorable to prepare the whole molded article with such resin and fibrous reinforcement, because the portion required to prevent cracks and deformations is only a part of the molded article.

SUMMARY OF THE INVENTION

The object of the present invention is to provide a molded article having no deformations or cracks in a specific portion, and a process for preparing the article by molding a plate material essentially consisting of a thermoplastic resin and a fibrous reinforcement.

The above object can be achieved by the process and molded article described below.

A process for preparing a molded article of fiber-reinforced plastic of arbitrary configuration by using a plate material consisting essentially of a fibrous reinforcement and a thermoplastic resin, comprising the steps of setting-up, on the plate material and/or in a mold, a sheet prepreg obtained by impregnating a unidirectionally arranged fiber or woven cloth with a thermoplastic resin in areas where the fibrous reinforcement does not satisfactorily follow the flow of the resin, or in areas where special reinforcement is required, and successively carrying out integral molding to obtain the article.

A molded article of fiber-reinforced plastic obtained by molding a plate material consisting essentially of a fibrous reinforcement and a thermoplastic resin, comprising a sheet prepreg obtained by impregnating a unidirectionally arranged fiber or woven cloth with a thermoplastic resin, and molded integrally with a portion of the plate material.

In accordance with the present invention, molded articles have reinforced strengths at ribbed portions and narrow sections therefore, and various molded articles of large to small volumes can be prepared without deformations and cracks.

DESCRIPTION OF THE PREFERRED EMBODIMENTS

The thermoplastic resins which are suitable for constituting the plate material include, for example, polystyrene polypropylene, polyethylene, AS resin, ABS resin, ASA resin (polyacrylonitrile.polystyrene.polyacrylate), polymethyl methacrylate, nylon, polyacetal, polycarbonate, polyethylene terephthalate, polyphenylene oxide, fluoro-resin, polyphenylene sulfide, polysulfone, polyether sulfone, polyether ketone, polyether ether ketone, polyimide and polyarylate.

Exemplary fibrous reinforcement materials which can constitute the plate material include glass fibers, carbon fibers, aramide fibers and silicon carbide fibers. The fibrous reinforcement has a form which should easily flow because an object is that the fibrous reinforcement can flow well with the resin and uniformly fill a mold. The fibrous reinforcement is generally used in the form of a mat. The matted fiber reinforcement includes, for example, reinforcement obtained by tying strands of about 2 inches in length with a binder, and the continuous strand mat obtained by tying continuous strands with binder. The surface of a suitable fibrous reinforcement will generally be treated by various methods in order to increase the adhesive property to resins used with it. However, in the case of a matted fibrous reinforcement it is difficult to use a surface treating agent because of interference by the binder as it is not able to exist on the boundary between the resin and the reinforcement, because the matted fibrous reinforcement is prepared by tying fibers with a binder. Therefore, the fibrous reinforcement will generally provide inferior adhesion to resins, and the property level of it tends to be low. The matted reinforcement tends to provide lower reinforcing effects than long continuous fibers which are unidirectionally arranged because fibers of the matted reinforcement have random directions and short lengths.

The plate material will usually prepared by using the thermoplastic resin and the fibrous reinforcement. For example, both top and under surfaces of the fibrous reinforcement will be continuously overlapped with a thermoplastic resin sheet, successively heated and impregnated with a molten thermoplastic resin, and followed by cooling to obtain the plate material.

The thickness of the plate material is preferably from 1 to 10 mm. In the case of molding the plate material by a stamping process, the thickness of the resulting molded article is an important subject.

The desired thickness of the molded article of FRTP is generally from several to several dozens millimeters. In order to prepare a thin-walled article having a thickness of several millimeters, a preferred thickness of the plate material is also about the same. When the thickness of the plate material is more than several times the thickness of the article to be molded, the resin and the fibrous reinforcement in the plate material separate while filling the heat-melted plate material into the mold. Hence, portions containing less proportion of the fibrous reinforcement and having lower strengths are liable to result and cause problems. In view of such circumstance, the thickness of the plate material is more preferably 3 mm or less. On the other hand, the plate material having a thickness of less than 1 mm cannot be commonly used because molding becomes difficult depending upon the process.

The content of fibrous reinforcement in the plate material is preferably from 30 to 70% by weight. In view of reinforcing effects alone, higher amounts are better. However, a content exceeding 70% by weight leads to flowability problems. In view of flowability, a more preferred content is 50% by weight or less.

Exemplary thermoplastic resins suitable for constituting the sheet prepreg include polystyrene, polypropylene, polyethylene, AS resin, ABS resin, ASA resin, polymethyl methacrylate, nylon, polyacetal, polycarbonate, polyethylene terephthalate, polyphenylene oxide, fluoro resin, polyphenylene sulfide, polysulfone polyether sulfone, polyether ketone, polyether ether ketone, polyimide and polyarylate.

The unidirectionally arranged fiber which constitutes the sheet prepreg refers to a set of prescribed numbers of a unidirectionally arranged yarn or roving obtained by collecting from 200 to 12000 monofilaments having a diameter of usually from 3 to 25 μm. Raw material which can be used include, for example, glass fibers, carbon fibers and silicon carbide fibers.

The woven cloth which constitutes the sheet prepreg refers to a plain-, satin-, bias- or twill-weaved material of textile yarn obtained by collecting from 200 to 12000 monofilaments having a diameter of usually 3 to 15 μm. Raw materials include, for example, glass fibers, carbon fibers and silicon carbide fibers.

The sheet prepreg can be obtained by impregnating the unidirectionally arranged fiber or woven cloth with the thermoplastic resin (hereinafter, the unidirectionally arranged fiber and the woven cloth are generally referred to as reinforcing fiber). The sheet prepreg can be obtained by various means; the most common methods being described below.

In one method, the reinforcing fiber is impregnated with a resin solution, and then the solvent is removed under defoaming to obtain the sheet prepreg. In another method, the reinforcing fiber is impregnated with a heat-melted resin, defoamed and cooled to obtain the sheet prepreg.

The prepreg thus obtained has excellent adhesion of the thermoplastic resin to the reinforcing fiber, and the fiber content can also be varied from 30 to 90% by weight depending upon demand. A thin sheet prepreg having a thickness of 0.1 to 1.0 mm can also be prepared. The sheet prepreg used for the present invention has a reinforcing fiber content of preferably from 30 to 90% by weight, more preferably from 50 to 90% by weight. The thickness is usually from 0.1 to 1.0 mm, preferably from 0.1 to 0.6 mm.

In preparing the sheet prepreg, the surface of the reinforcing fiber to be used is more preferably treated by the following method.

For example, in the case where glass fiber is used as the reinforcing fiber, the glass fiber is treated with a silane base, titanate base or zirconium base coupling agent to improve adhesion to the resin.

The most suitable coupling agent should be selected for the glass fiber depending upon the thermoplastic resin to which it is to be combined. Practical examples of the agent will be illustrated below.

When the thermoplastic resin is a nylon resin, $\gamma$-aminopropyl-trimethoxysilane and N-$\beta$-(aminoethyl)-, $\gamma$-aminopropyl-trimethoxysilane are suitable.

In the case of polycarbonate resin, $\gamma$-aminopropyl trimethoxysilane and N-$\beta$-(aminoethyl)-$\gamma$-aminopropyl-trimethoxysilane are suitable.

In the case of polyethylene terephthalate or polybutylene terephthalate, $\beta$-(3,4-epoxycyclohexyl)ethyl-trimethoxysilane, $\gamma$-glycidoxy-propyltrimethoxysilane, and $\gamma$-aminopropyl-trimethoxysilane are suitable.

In the case of polyethylene or polypropylene, vinyl-trimethoxysilane, vinyl-tris(2-methoxyethoxy)silane and $\gamma$-methacryloxy-propyltrimethoxysilane are suitable.

In the case of polyphenylene oxide, polyphenylene sulfide, polysulfone, polyether sulfone, polyether ketone, polyether ether ketone, polyimide, polyarylate or fluoro resin, the above coupling agents can of course be used. Additionally N-($\beta$-aminoethyl)-$\gamma$-aminopropyl-methyldimethoxysilane, $\gamma$-chloropropylmethyldimethoxy silane, $\gamma$-mercaptopropyltrimethoxysilane and p-aminophenyl-triethoxysilane can be used.

When the reinforcing fiber is other than glass fiber, treatment is carried out in many cases by using amine curing type epoxy resin as a coupling agent. Exemplary epoxy resins suitable for use include bisphenol A type epoxy resins, novolak type epoxy resins, alicyclic base epoxy resins, aliphatic base epoxy resins and glycidyl ester type epoxy resins.

The coupling agent can be applied to the surface of the reinforcing fiber by the following method.

After removing the binding agent, the fiber is completely impregnated with a solution containing from 0.1 to 3% by weight of a coupling agent by such means as dipping, spraying and coating.

The resultant fiber containing the coupling agent solution is dried at 60° to 120° C. to react the coupling agent with the surface of the fiber. A drying time is required for completely evaporating the solvent, and a time of 15 to 20 minutes is sufficient.

As the solvent for dissolving the coupling agent, water is used in some cases after adjusting the pH of 2.0 to 12.0 depending upon the coupling agent used. In other cases, organic solvents such as ethanol, toluene, acetone and xylene are used independently or as a mixture.

The above obtained plate material essentially consisting of the thermoplastic resin and the fibrous reinforcement, and the sheet prepreg obtained by impregnating the unidirectionally arranged fiber or the woven cloth with the thermoplastic resin are used to prepare the molded article, for example, by the following processes.

(1) In the case of using a mold having a ribbed portion and a narrow section, where only the resin of the plate material can flow in the mold and the fibrous reinforcement of the plate material does not flow well a prescribed amount of the sheet prepreg having a desired size is maintained above the flowable temperature of the thermoplastic resin, and sufficiently packed in the ribbed portion or the narrow section in the mold. Then, the plate material which has been maintained above the flowable temperature of the thermoplastic resin is put in the mold. The mold is successively pressed for a short time to carry out forming, defoaming and cooling, and thereafter, a molded article is taken out of the mold. In the process, the resin in the plate material is preferably the same as that of the prepreg. The narrow section in the mold refer to portions where the plate material does not flow well. When the narrow section is 2 mm or less in particular, the effect of the present invention is remarkable.

The molded article obtained by process (1), can have reinforced strengths at both ribbed and narrow sections and is highly valuable in practical use.

(2) Prescribed numbers of the sheet prepreg are stacked in an arbitrary portion on the sheet material in order to locate the sheet prepreg at the portion where shape of the molded article is liable to deform or the portion where cracks tend to occur; for example, bottom the and a cured area of a molded box. The sheet material thus obtained is maintained above the flow temperature of the thermoplastic resin and then placed in a mold and pressed for a short time to carry out forming, defoaming and cooling. In the process, the resin in the plate material is preferably the same as that of the prepreg.

In process (2), the sheet prepreg is set-up on either one or both of the surface and back of the plate material. Hence, an extremely remarkable increase in strength can be obtained, compared to those cases where a sheet prepreg is inserted between the plate materials to locate them at the center layer of the molded article. By the process, various molded articles of large to small volumes can be prepared without deformations and cracks.

Additionally, processes (1) and (2) can be carried out in combination, if necessary.

The sheet prepreg may be stacked in optional numbers, preferably 10 or less, at the portion to be reinforced. In order to prevent unidirectional concentration of reinforcing fiber, the sheet prepreg is preferably stacked so as to alternately cross the direction of fiber. Preferred amounts of the sheet prepreg are 10% by weight or less of the total amount of the molded article.

The molding in the process of the present invention is preferably carried out by stamping. In the stamping process, the plate material and the sheet prepreg are usually maintained at a temperature higher than the flow temperature of the resin prior to being put in the mold. The temperature is preferably at least 30° C. higher than the flow temperatures of the resin. Mold temperature are usually set below the flow temperature of the resin. Preferred temperatures of the mold are less than flow temperature of the resin −30° C. Room temperature is also available for the mold.

By using the molding process mentioned above, various molded articles of large to small volumes can be prepared limiting the tendency of deformation and cracks which are found in conventional processes.

Molding processes other than stamping can also be used. For example, in a so-called press molding process, the plate material and the sheet prepreg are pressed at a temperature higher than the flow temperature of the resin in a mold mounted on a press machine for 10 seconds to 60 minutes under pressure of 1 to 300 kg/cm$^2$ per projected area of 1 cm$^2$. After cooling to a temperature lower than the flow temperature of the resin, the molded article is released from the mold. In a so-called autoclave molding process, the plate material and the prepreg are heated under vacuum to a temperature above the flow temperature of the resin, followed by forming, and defoaming under increased pressure of 20 kg/cm$^2$ or less, and then cooled to a temperature lower than the glass transition point of the resin to take the molded article out of the mold.

The flow temperature of the resin is, for example, 210° C. in the case of polystyrene, polypropylene, polyethylene, AS resin, ABS resin, ASA resin, polymethyl methacrylate, nylon and polyacetal; 230° C. in the case of polyethylene terephthalate and fluoro resin; 250° C. in the case of polyphenylene oxide; 270° C. in the case of polycarbonate; 320° C. in the case of polyphenylene sulfide and polysulfone; 360° C. in the case of polyether sulfone; 370° C. in the case of polyether ether ketone; and 390° C. in the case of polyether ketone, polyimide and polyarylate.

The present invention will hereinafter be illustrated further in detail by way of examples and comparative examples.

The plate material which is used in the examples and comparative examples below had a combination of the thermoplastic resin and the fibrous reinforcement illustrated in Table 1.

The plate material a is available in the market under the trade mark "Azdel" from Ube Nitto Kasei Co., Ltd. The thermoplastic resin used in "Azdel" is polypropylene and glass fiber content is 40% by weight.

The plate materials b, c and d were prepared by the method described below.

A fibrous reinforcement was inserted between the two resin sheets having a calculated thickness so as to obtain a prescribed fiber content. The resultant laminate was put in a mold which was previously heated to 270° C., pressed for 5 minutes under pressure of 50 kg/cm$^2$ cooled to 50° C. at a cooling rate of 10° C./minutes, and thereafter taken out of the mold to obtain the plate material. The thickness and fibrous reinforcement content of the plate materials thus obtained are illustrated in Table 1.

The sheet prepreg containing the unidirectionally arranged fiber which was used in the examples of the invention was prepared according to the description in Japanese Patent Laid-Open No. 61-229535 (1986). That is, 100 yarns obtained by collecting 1600 monofilaments of 13 μm in size, which were surface treated with γ- methacryloxy-propyltrimethoxysilane were paralleled to a width of 200 mm under uniform tension, brought into contact with heat-melted thermoplastic resin under tension, and impregnated with the resin by wiping between hot rolls to obtain the sheet prepreg.

The sheet prepreg containing the cloth was prepared according to the description in Japanese Patent Laid-Open No. 61-229535 (1986). That is, a cloth of 200 mm in width was rolled, brought into contact with heat-melted thermoplastic resin under tension, and impregnated with the resin by wiping between hot rolls to obtain the sheet prepreg.

The matrix resin and reinforcing fiber used for the sheet prepreg and the content of the reinforcing fiber are illustrated in Table 2. Glass cloth and carbon cloth were subjected to the following treatment before impregnation with the resin.

A glass cloth H201FT from Unitika UM Glass Co., Ltd. was subjected to heat cleaning at 400° C. for 10 hours, passed through an 0.3% by weight aqueous solution of γ-aminopropyltrimethoxysilane and dried at 100° to 110° C. for 10 minutes.

A carbon cloth #6343 from Toray Industries Co., Ltd. was washed by immersing in acetone, air-dried at room temperature and further dried at 100° C. for 10 minutes to obtain the carbon cloth.

EXAMPLE 1

Plate material a (1 in the drawings) having a thickness of 3 mm was cut into a size of 150 mm (W1 in the drawings) × 180 mm (L1 in the drawings).

Prepreg A having a thickness of 0.3 mm was cut into each two pieces having dimensions of 30 mm (W2) × 100 mm (L2) and 30 mm (W3) × 130 mm (L3), respectively. These pieces were cut so as to make the direction of fiber arrangement (8) in the prepreg parallel to the side having a length of 30 mm.

Figure 1:
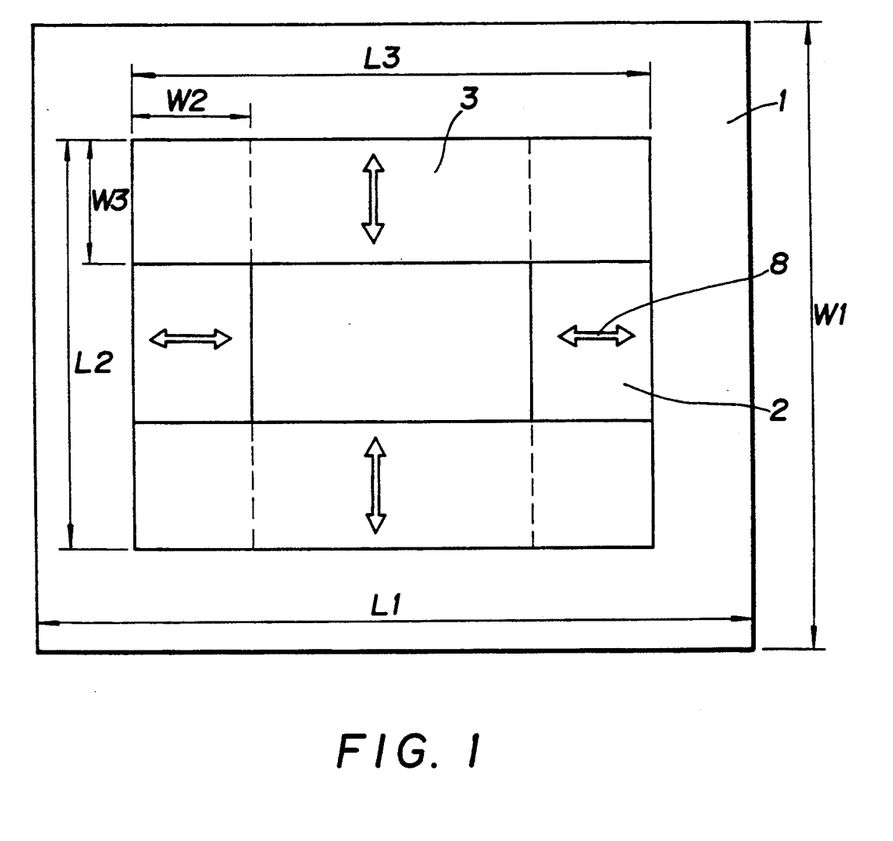
FIGS. 1 and 4 are illustrate examples of stacking the sheet prepreg at a portion on the plate material prior to molding.

As illustrated in FIG. 1, each one piece of the prepreg (2) or (3) was placed respectively at four portions corresponding, on plate material a (1), to the bottom edge of the molded box. The laminate thus obtained was preheated at 250° C. for 2 minutes in a far infrared oven, and put in a mold which was previously heated to 70° C. so as to make the prepreg-placed surface inside.

Figure 2:
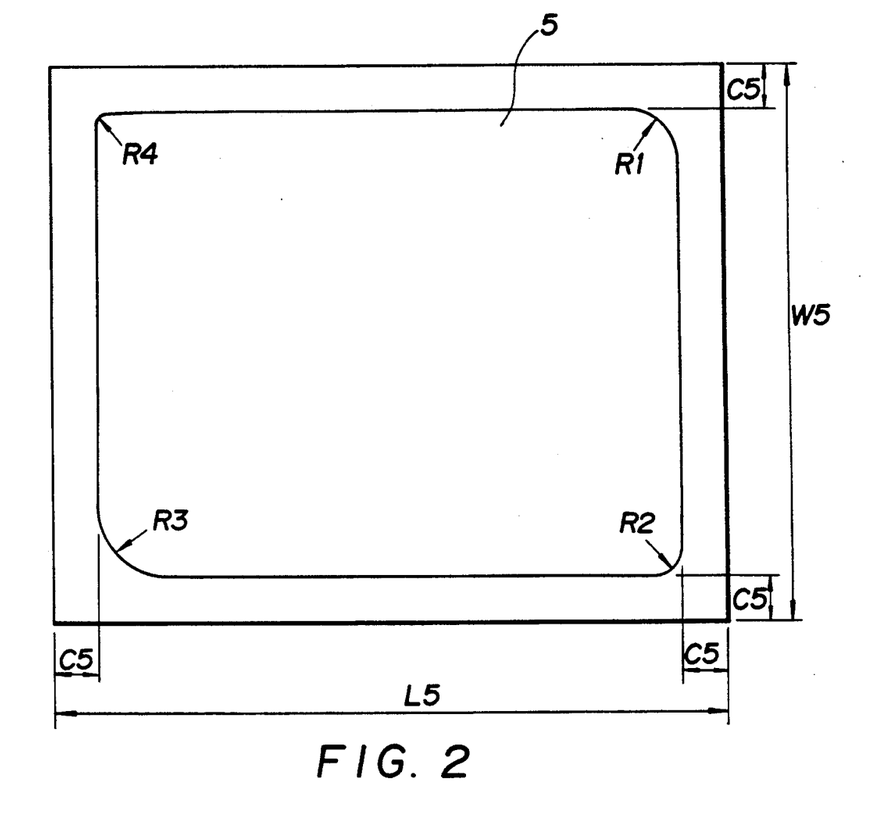
FIGS. 2 and 5 are plane views of molded boxes obtained in the example and the comparative example.
Figure 3:
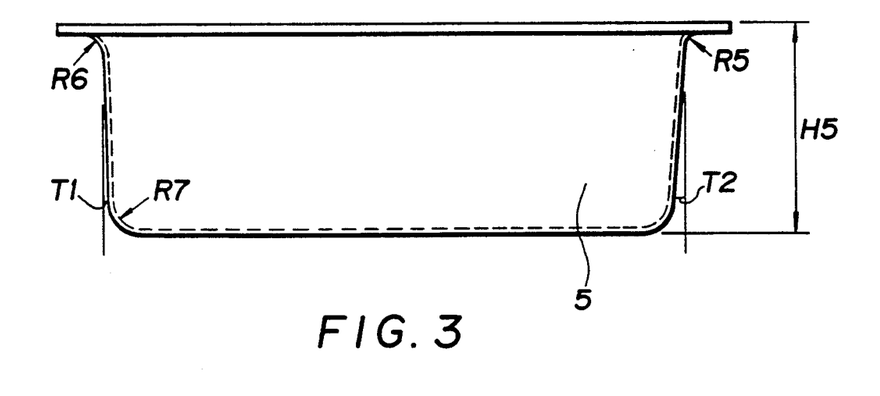
FIGS. 3 and 6 are side views of the molded boxes.

Then the mold was clamped within 10 seconds, pressed for 30 seconds under load of 50 tons, and de-molded to obtain a molded box (5) illustrated in FIGS. 2 and 3.

The molded box (5) was designed to have structure suitable for evaluating resistance to deformation. Actual dimensions of the molded box are illustrated below.

```
L5 = 150 mm, W5 = 120 mm, H5 = 45 mm,
C5 = 10 mm, T1 = 1.5°, R1 = radius of curvature
10^R, R2 = 5^R, R3 = 15^R, R4 = 2^R,
R5 = 2^R, R6 = 5^R, R7 = 5^R.
```

In order to evaluate degree of deformation on the molded box, warpage toward inside at the center of long sides was measured on the molded box. Results are illustrated in Table 3.

Breaking load of the molded box was measured by the following method. The molded box was laid upside down and a rod of 20 mm in diameter and 40 mm in height which was used for a loading plate was placed at the center of the bottom surface of the box through a rubber plate having a thickness of 5 mm. Load was added at a loading rate of 5 mm/min to measure breaking load. Results are illustrated in Table 3.

EXAMPLE 2

Prepreg A was cut into each four pieces having dimensions of 30 mm × 100 mm and 30 mm × 130 mm, respectively.

A molded box was prepared by carrying out the same procedures as described in Example 1 except that each two pieces were placed at four portions corresponding to the edge on the bottom of the molded box. Degree of deformation and breaking load of the molded box thus obtained were measured by the same procedures as described in Example 1. Results are illustrated in Table 3.

EXAMPLE 3

Prepreg A was cut into each six pieces having dimensions of 30 mm × 100 mm and 30 mm × 130 mm, respectively.

A molded box was prepared by carrying out the same procedures as described in Example 1 except that each three pieces were placed at four portions corresponding to the edge on the bottom of the molded box. Degree of deformation and breaking load of the molded box thus obtained were measured by the same procedures as described in Example 1. Results are illustrated in Table 3.

EXAMPLE 4

Prepreg A was cut into each eight pieces having dimensions of 30 mm × 100 mm and 30 mm × 130 mm, respectively.

A molded box was prepared by carrying out the same procedures as described in Example 1 except that each four pieces were placed at four portions corresponding to the edge on the bottom of the molded box. Degree of deformation and breaking load were measured by the same procedures as described in Example 1. Results are illustrated in Table 3.

EXAMPLE 5

A molded box was prepared by carrying out the same procedures as described in Example 2 except that prepreg B was used in place of prepreg A. Degree of deformation and breaking load of the molded box thus obtained were measured by the same procedures as described in Example 1. Results are illustrated in Table 3.

EXAMPLE 6

A molded box was prepared by carrying out the same procedures as described in Example 4 except that prepreg C was used in place of prepreg A. Degree of deformation and breaking load of the molded box thus obtained were measured by the same procedures as described in Example 1. Results are illustrated in Table 3.

EXAMPLE 7

A molded box was prepared by carrying out the same procedures as described in Example 2 except that prepreg D was used in place of prepreg A. Degree of deformation and breaking load of the molded box thus obtained were measured by the same procedures as described in Example 1. Results are illustrated in Table 3.

EXAMPLE 8

A molded box was prepared by carrying out the same procedures as described in Example 2 except that prepreg E was used in place of prepreg A and plate material b was used in place of plate material a. The thickness of plate material b was 3.3 times that of plate material a. Accordingly, dimensions of the plate material were changed from 180 mm×150 mm to 100 mm×80 mm. Degree of deformation and breaking load of the molded box thus obtained were measured by the same procedures as described in Example 1. Results are illustrated in Table 3.

EXAMPLE 9

A molded box was prepared by carrying out the same procedures as described in Example 2 except that prepreg F was used in place of prepreg A, plate material c was used in place of plate material a, and the temperature of the far infrared oven was maintained at 280° C. Degree of deformation and breaking load of the molded box thus obtained were measured by the same procedures as described in Example 1. Results are illustrated in Table 3.

EXAMPLE 10

A molded box was prepared by carrying out the same procedures as described in Example 3 except that prepreg G was used in place of prepreg A, plate material d was used in place of plate material a. Degree of deformation and breaking load of the molded box thus obtained were measured by the same procedures as described in Example 1. Results are illustrated in Table 3.

EXAMPLE 11

Plate material a(1) having a thickness of 3 mm was cut into a size of 150 mm (W1)×180 mm (L1).

Prepreg B having a thickness of 0.5 mm was cut into each four pieces having dimensions of 30 mm (W4)×130 mm (L4).

These pieces were cut so as to make the direction of fiber arrangement (8) in the prepreg parallel to the side having a length of 30 mm.

Figure 4:
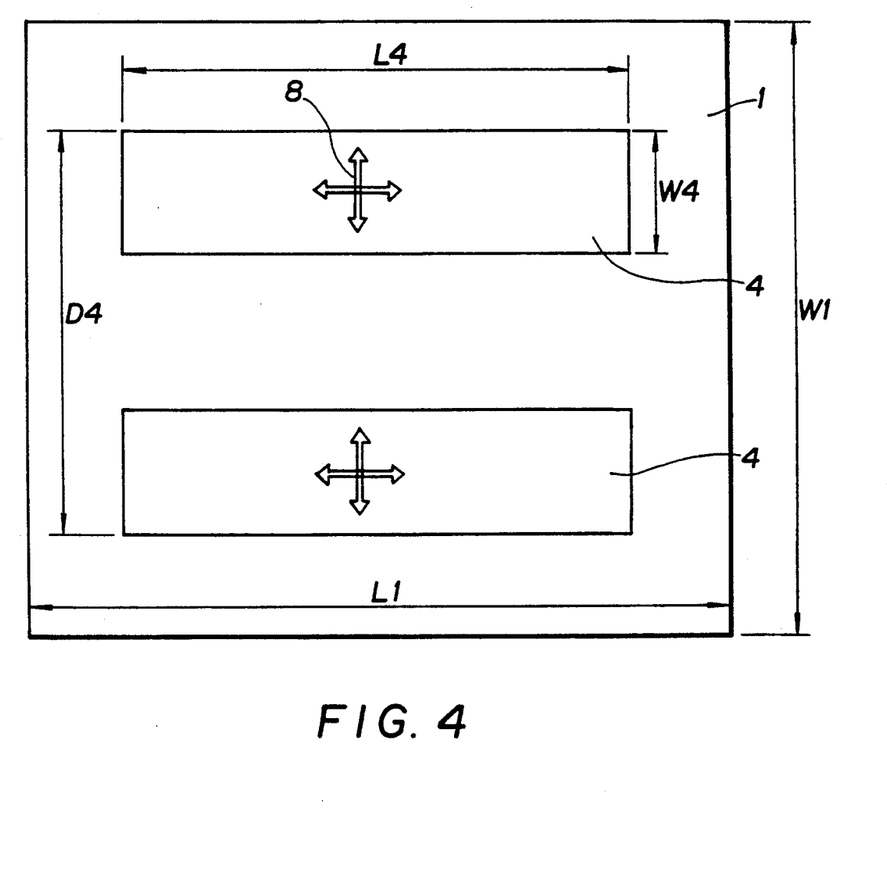
Figure 5:
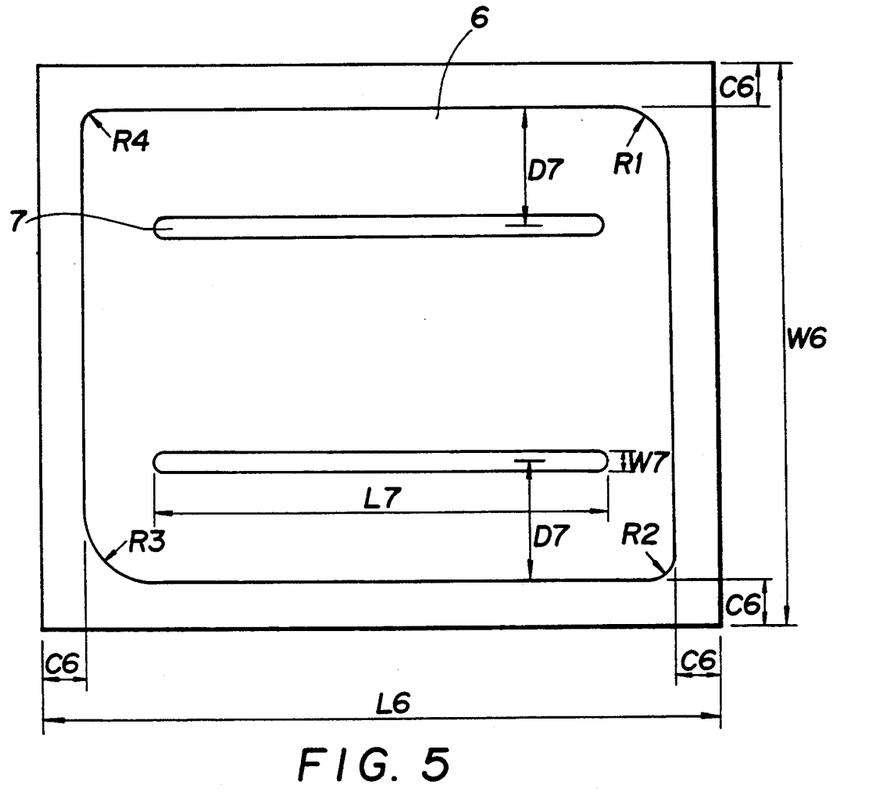
Figure 6:
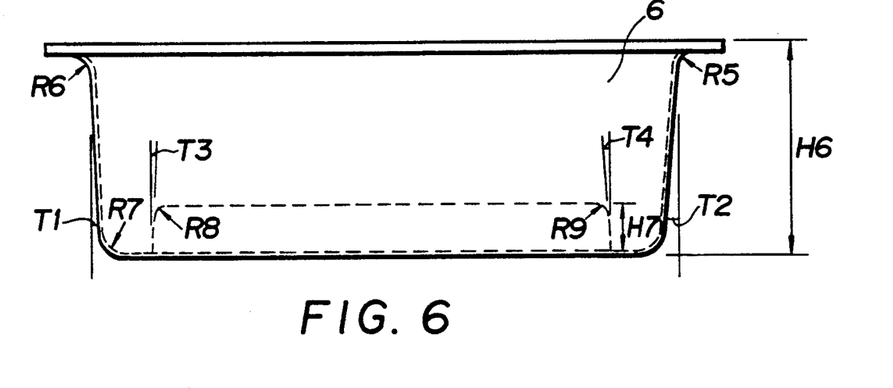

As illustrated in FIG. 4, two pieces of the prepreg were stacked on each area of plate material a(1) to a thickness of 1 mm with a spacing (D4) of 100 mm between the prepreg. The laminate thus obtained was preheated at 250° C. for 2 minutes in a far infrared oven, and put in a mold which was previously heated to 70° C. so as to make the prepreg-placed surface inside. Then the mold was clamped within 10 seconds, pressed for 30 seconds under load of 50 tons, and demolded to obtain a molded box (6) having two ribs (7) on the bottom as illustrated in FIGS. 5 and 6. Actual dimensions of the molded box (6) are illustrated below.

$L6 = 150$ mm, $W6 = 120$ mm, $H6 = 45$ mm, $C6 = 10$ mm, $T1 = 1.5°$, $T2 = 5°$, $T3 = 1.5°$, $T4 = 1.5°$, $L7 = 100$ mm, $W7 = 4$ mm, $D7 = 75$ mm, $H7 = 10$ mm, $R1$ = radius of curvature $10^R$, $R2 = 5^R$, $R3 = 15^R$, $R4 = 2^R$, $R5 = 2^R$, $R6 = 5^R$, $R7 = 5^R$, $R8 = 3^R$, $R9 = 3^R$ A falling ball impact test and a measurement of breaking load concerning the molded box were conducted. The falling ball impact test was conducted by the following method. The molded box was laid upside down and a steel ball having a diameter of 100 mm was dropped by gravity from a height of 40 cm above the molded box to the center of the bottom surface of the box through a rubber plate having a thickness of 5 mm. Breakage of the ribbed portion was observed and the breakage load of the molded box was measured by the same procedures as described in Example 1. The results are illustrated in Table 4.

EXAMPLE 12

Plate material a (1) having a thickness of 3 mm was cut into a size of 150 mm (W1)×180 mm (L1).

Prepreg B having a thickness of 0.5 mm was cut into two pieces having dimensions of 30 mm (W4)×130 mm (L4) so as to make the fiber direction (8) of the prepreg parallel to the side having a length of 30 mm.

Prepreg A was cut into two-pieces having a width of 95 mm in the fiber direction and a length of 200 mm in the rectangular direction to fiber. Each piece of prepreg A was rounded into the form of a cylinder so as to make the cylinder axis parallel to the fiber direction. Prepreg A thus rounded was placed on the center of prepreg B so as to make the cylinder axis of prepreg A parallel to the long side of prepreg B. The plate material and the combination of prepreg thus obtained were separately preheated at 250° C. for 2 minutes in a far infrared oven. The mold of FIGS. 5, 6 for use in molding a box was heated to 70° C. and the preheated prepreg combination was packed into the rib so as to make prepreg B outside. Thereafter the plate material was put in the mold. The mold was then clamped within 10 seconds, pressed for 30 seconds under load of 50 tons and demolded to obtain a molded box.

A falling ball impact test and a measurement of breaking load were conducted on the molded box thus obtained by the same procedures as described in Example 11. Results are illustrated in Table 4.

COMPARATIVE EXAMPLE 1

Plate material a was cut into a size of 150 mm×180 mm, preheated at 250° C. for 2 minutes in a far infrared oven. A mold illustrated in FIGS. 2, 3 for use in molding a box was heated to 70° C. and the plate material was put in the mold. Thereafter the mold was clamped within 10 minutes, pressed for 30 seconds under load of 50 tons and demolded to obtain a molded box.

Degree of deformation and breaking load of the box thus obtained were measured by the same procedures as described in Example 1 and results are illustrated in Table 3.

COMPARATIVE EXAMPLE 2

Prepreg was replaced by plate material a having a thickness of 1 mm which was cut into each two pieces having the same dimensions as described in Example 1.

The pieces of the plate material a having a thickness of 1 mm were placed on plate material a having a thickness of 3 mm by the same manner as described in Example 1.

A molded box was prepared from the laminate thus obtained by carrying out the same procedures as described in Example 1. Degree of deformation and breaking load of the box thus obtained were measured and results are illustrated in Table 2.

COMPARATIVE EXAMPLE 3

A molded box was prepared by carrying out the same procedures as described in Example 11 except that prepreg B was omitted. A falling ball impact test was carried out on the box thus obtained and results are illustrated in Table 4.

The shapes of molded articles prepared by the molds used in the examples and comparative examples are illustrated in FIGS. 2 and 3, and FIGS. 5 and 6.

These molds have a surface area of about 380 cm² and the size of the plate material to be put into the mold was set to about 70% of the surface area of the mold as illustrated in FIGS. 1 and 4. The molds are designed to give about 2 mm in thickness of the molded product.

A molded article having a thickness of 2 mm can be shaped by putting into the mold a plate material having a thickness of 3 mm and a size illustrated in FIGS. 3 and 4. Consequently, when the thickness of the plate material is increased, the area of the plate material must be decreased by the ratio of thickness exceeding 3 mm.

The numbers of the sheet prepreg put into the mold are better as few as possible in view of productivity. Hence, functionally most efficient numbers of the prepreg in combination with the plate material may be determined by trial and error.

TABLE 1

| Plate material | Resin | Fibrous reinforcement | Thickness (mm) | Fibrous reinforcement content (wt %) |
| --- | --- | --- | --- | --- |
| a | polypropylene | glass fiber continuous strand mat | 3 and 1 | 40 |
| b | acrylonitrile-styrene | glass fiber continuous strand mat | 10 | 30 |
| c | polycarbonate | glass fiber continuous strand mat | 3 | 50 |
| d | nylon 6 | glass fiber chopped strand mat | 3 | 70 |

TABLE 2

| Prepreg | Resin | Reinforcing fiber | Thickness (mm) | Reinforcing fiber content (wt %) |
| --- | --- | --- | --- | --- |
| A | polypropylene | glass yarn | 0.3 | 80 |
| B | polypropylene | glass cloth | 0.5 | 80 |
| C | polypropylene | carbon yarn | 0.2 | 74 |
| D | polypropylene | carbon cloth | 0.4 | 74 |
| E | acrylonitrile-styrene | glass yarn | 0.5 | 30 |
| F | polycarbonate | glass yarn | 0.6 | 50 |
| G | nylon 6 | glass yarn | 0.3 | 90 |

TABLE 3

| | Warpage toward inside (mm) | Breaking load (kg) |
| --- | --- | --- |
| Example 1 | 0 | 60 |
| Example 2 | 0 | 68 |
| Example 3 | 0 | 70 |
| Example 4 | 0 | 71 |
| Example 5 | 0 | 65 |
| Example 6 | 0 | 74 |
| Example 7 | 0 | 68 |

TABLE 3-continued

| | Warpage toward inside (mm) | Breaking load (kg) |
| --- | --- | --- |
| Example 8 | 0 | 62 |
| Example 9 | 0 | 69 |
| Example 10 | 0 | 74 |
| Comparative Example 1 | 5 | 55 |
| Comparative Example 2 | 3 | 57 |

TABLE 4

| | Appearance of failure at ribbed portion of the box | Breaking load (kg) |
| --- | --- | --- |
| Example 11 | no failure | 78 |
| Example 12 | no failure | 93 |
| Comparative Example 3 | ribbed portion was delaminated on both ends | 63 |

What is claimed is:

1. A process for preparing a molded article of fiber-reinforced plastic using a plate material comprising a fibrous reinforcement material and a thermoplastic resin, said process comprising the steps of (i) setting-up a sheet prepreg either on the plate material, in a mold, or on the plate material and in a mold, in areas where the fibrous reinforcement would not follow the flow of the resin with substantial uniformity, or in areas where special reinforcement is required, wherein the sheet prepreg is obtained by impregnating a unidirectionally arranged fiber or woven cloth with a thermoplastic resin, and the fibrous reinforcement material in the plate material is from 30 to 70 wt. %, and (ii) maintaining the plate material above the flow temperature of the thermoplastic resin of the plate material and maintaining the sheet prepreg above the flow temperature of the thermoplastic resin of the sheet prepreg, and compressing them in the mold to integrally mold to obtain said molded article.

2. A process according to claim 1, wherein the fibrous reinforcement material of the plate material is a mat reinforcement material.

3. A process according to claim 1, wherein the plate material is obtained by impregnating the fibrous reinforcement material with a thermoplastic resin.

4. A process according to claim 1, further comprising the step of stacking predetermined numbers of sheet prepreg cut into a desired shape, in at least one of ribbed portions of the mold and narrow sections of the mold, wherein only the resin of the plate material, but not the fibrous reinforcement material of the plate material can substantially flow into the narrow sections thereof, and thereafter filling up the mold with the plate material.

5. A process according to claim 1, further comprising the step of stacking one or more sheet prepregs in areas on the plate material where additional reinforcement is required, due to the form of the molded article.

6. A process according to claim 1, wherein the thickness of the plate material is from 1 to 10 mm.

7. A process according to claim 1, wherein the thickness of the sheet prepreg is from 0.1 to 1.0 mm.

8. A process according to claim 1, wherein the content of the fiber or the woven cloth in the sheet prepreg is from 30 to 90 wt. %.

* * * * *

UNITED STATES PATENT AND TRADEMARK OFFICE
CERTIFICATE OF CORRECTION

PATENT NO. : 5,294,394
DATED : March 15, 1994
INVENTOR(S) : Sakai, et al

It is certified that error appears in the above-indentified patent and that said Letters Patent is hereby corrected as shown below:

On the title page: Item [30] PCT "2-57072 should be --1-257072 --.

Signed and Sealed this

Twenty-seventh Day of September, 1994

Attest:

BRUCE LEHMAN

Attesting Officer

Commissioner of Patents and Trademarks